United States Patent [19]

Tsuyama et al.

[11] Patent Number: 5,731,976
[45] Date of Patent: Mar. 24, 1998

[54] TRACTION CONTROL SYSTEM FOR VEHICLES

[75] Inventors: Toshiaki Tsuyama; Tomoyuki Hirao, both of Hiroshima-ken, Japan

[73] Assignee: Mazda Motor Corporation, Hiroshima-ken, Japan

[21] Appl. No.: 374,170

[22] Filed: Jan. 18, 1995

[30] Foreign Application Priority Data

Jan. 21, 1994 [JP] Japan .................................. 6-022150

[51] Int. Cl.⁶ .................................................. B60K 28/16
[52] U.S. Cl. ...................... 364/426.029; 364/426.032; 180/197
[58] Field of Search ............... 364/426.027, 426.029, 364/426.032; 180/197

[56] References Cited

U.S. PATENT DOCUMENTS

| | | | |
|---|---|---|---|
| 4,866,618 | 9/1989 | Tamura et al. ..................... | 364/426.02 |
| 4,964,045 | 10/1990 | Iwata et al. ........................ | 364/426.02 |
| 5,060,746 | 10/1991 | Nobumoto et al. ................. | 364/426.02 |
| 5,458,212 | 10/1995 | Nishihara et al. .................. | 364/426.03 |

FOREIGN PATENT DOCUMENTS

| | | |
|---|---|---|
| 60-99757 | 6/1985 | Japan . |
| 63-166649 | 7/1988 | Japan . |

*Primary Examiner*—Gary Chin
*Attorney, Agent, or Firm*—Morrison & Foerster LLP

[57] ABSTRACT

An engine control system for an automotive vehicle for controlling slippage through fuel-cut and ignition retardation makes a correction in which an engine output control parameter is changed smaller every time a low slippage continuing time reaches each of predetermined threshold times so as to increase engine output, thereby improving acceleration of the vehicle.

16 Claims, 11 Drawing Sheets

FIG. 11
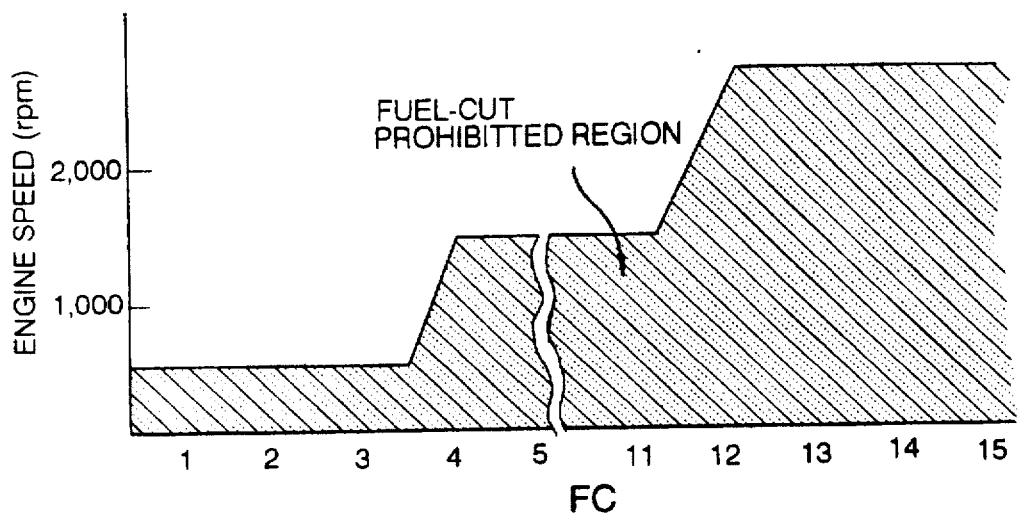
FIG. 12
| LOW SLIPPAGE STATE JUDGEMENT | LOW SLIPPAGE STATE CONTINUING TIME | CONTROL LEVEL CORRECTION |
|---|---|---|
| $Vd \geq V + 0.5$ Km/h | TIMER Tm RESET | 0 |
| $Vd < V + 0.5$ Km/h | $T < Th1 = 250$ ms | 0 |
| | $T \geq Th1 = 250$ ms | -1 |
| | $T \geq Th2 = 1,000$ ms | -1 |
| | $T \geq Th3 = 2,000$ ms | -1 |
FIG. 13
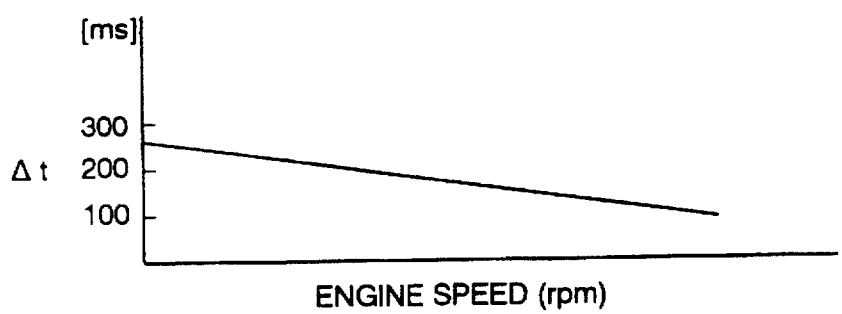

TRACTION CONTROL SYSTEM FOR VEHICLES

BACKGROUND OF THE INVENTION

1. Field of the Invention

The present invention relates to a traction control system for a vehicle, and, more particularly, to a vehicle traction control system which prevents poor acceleration under low slippage driving conditions and also prevents an engine from providing excessively large driving force.

2. Description of Related Art

In order for automotive vehicles to prevent a deterioration in driving performance due to slippage of driving wheels which is caused by excessive driving torque, it is typical to control or decrease engine output and control or increase braking force to wheels so that slippage of driving wheels approaches a desired or target amount of slippage. Such traction control is performed based on the amount of slippage of the driving wheels which is refereed to as a wheel slippage amount Sw. In traction control systems of this kind, a wheel slippage amount Sw is defined by a ratio of wheel speed between the driving wheels and the driven wheels. On the other hand, a target amount of slippage (which is hereafter referred to as a target wheel slippage amount St) is obtained based on a vehicle speed depending upon the speed of driven wheels and the coefficient of friction of a road surface which is estimated according to speed and acceleration of driven wheels. A detailed description of a representative example of such wheel slippage control may be found in Japanese Unexamined Patent Publication No. 60-99757.

In order to control engine output so as to control slippage of the driving wheels, it is typical to retard ignition timing and/or cut fuel supply or to reduce the amount of intake air by means of throttling a secondary valve in an intake passage. It is also typical as a braking force control technique to brake driving wheels. In terms of durability of braking devices, a traction control is performed, on one hand, by decreasing engine output when slippage is small and, on the other hand, by increasing braking force, simultaneously with decreasing engine output, when slippage is large. Such a traction control system is known from, for instance, Japanese Unexamined Patent Publication No. 63-166649.

If a vehicle, under the traction control, travels transitionally from a road with a low friction coefficient to a road with a high friction coefficient, the vehicle experiences a low slippage state in which the speed of driving wheel approaches closely the speed of driven wheels. In such a low slippage state, because the wheel slippage amount is considerably smaller than the target wheel slippage amount, there is the tendency that the efficiency of transferring driving force from the driving wheels to the road becomes lower. As a result, in the low slippage state, the vehicle experiences poor acceleration upon hitting an accelerator pedal.

While, in order to provide fine acceleration in the low slippage state, it is considered effective to control an engine so as to increase engine output, nevertheless, since the traction control possibly forces the engine to increase engine output in the low slippage state, there is caused an undesirable excessive increase in engine output due to a demand for improved acceleration on the engine and performing the traction control.

Particularly, if the traction control system is of a type which cuts fuel supply during engine output control and an increase in engine output in the low slippage state puts a demand on the traction control, it can not be expected to increase engine output quickly. This is because, in the case where engine output is controlled by fuel cut, a large amount of engine output change can occur and the engine output control through the fuel cut becomes effective only after a few, for instance, two or three, revolutions of the engine crankshaft.

SUMMARY OF THE INVENTION

It is an object of the present invention to provide a traction control system for an automotive vehicle which prevents poor acceleration under low slippage driving conditions and also prevents an engine from providing excessively large output.

The above object of the present invention is achieved by providing a traction control system for an automotive vehicle for controlling output of an engine so as to bring slippage of driving wheels close to target slippage. The traction control system calculates a target amount of slippage based on wheel speeds of driven wheels and an actual amount of slippage of driving wheels based on the wheel speeds of the driving and driven wheels. Engine output is controlled so as to bring the actual amount of slippage of the driving wheels to the target amount of slippage. The engine output is corrected during a period of time of a low slippage state where a difference in average wheel speed between the driving wheels and driven wheels is less than a predetermined speed so as to be increased with an increase in the period of time. This correction of engine output is restrained when the engine output is increasingly changed during counting the period of time.

Specifically, the traction control system calculates the target amount of slippage based on the wheel speeds of the driven wheels and a road friction coefficient of a road on which the vehicle is traveling. Controlling engine output may be governed by means of fuel-cut in predetermined patterns. Further, the correction of an engine output control parameter may be performed with a delay of a predetermined time. Restraining the correction of an engine output control parameter may be made by delaying the commencement of engine output control, or otherwise by counting the period of time with a delay of a predetermined time.

Preferably, the correction of engine output control parameter is made every time that the period of time reaches each of a plurality of threshold times, predetermined stepwise. Each threshold time is tempered with a predetermined time which may be decreasingly changed with an increase in engine speed.

With the engine control system of the present invention, if the vehicle experiences a low slippage state when it travels transitionally from a road with a low friction coefficient to a road with a high friction coefficient, the engine output is increased according to an increase in the slippage continuing time. Accordingly, even in the low slippage state, the vehicle shows fine acceleration. Furthermore, when the engine is controlled so as to increase its output, the correction of engine output control parameter is restrained, thereby preventing the engine from providing an excessive output.

Although, when an engine output control parameter which roles fuel-cut patterns for engine output control is used, the engine experiences a wide range of changes in output and the fuel cut control develops its significant effect only after a few revolutions of the engine crankshaft, the correction of engine output control parameter made by the engine control system provides a notable improvement of acceleration. In addition, the engine output control parameter correction is easily restrained by delaying the commencement of the correction of an engine control parameter, or otherwise by counting the slippage continuing time with a delay of a predetermined time.

The correction of engine output control parameter is made every time that the continuing time reaches each of a plurality of threshold times by adding to the threshold time a predetermined time. Since a time, necessary for the engine crankshaft to make a few revolutions only after which the fuel-cut control develops its significant effect, becomes shorter with an increase in engine speed, the predetermined time may be changed shorter with an increase in engine speed. In other words, when a low slippage state disappears resulting from an engine output increase provided by the traction control, the correction of engine output control parameter is brought to a halt, so as to prevent the engine from providing output excessively.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIG. 11 is a map illustrating a range of fuel-cut;

FIG. 12 is a diagram showing threshold time and control level correction value;

FIG. 13 is a diagram showing change of a time relating engine speed; and

DETAILED DESCRIPTION OF THE PREFERRED EMBODIMENTS

Figure 1:
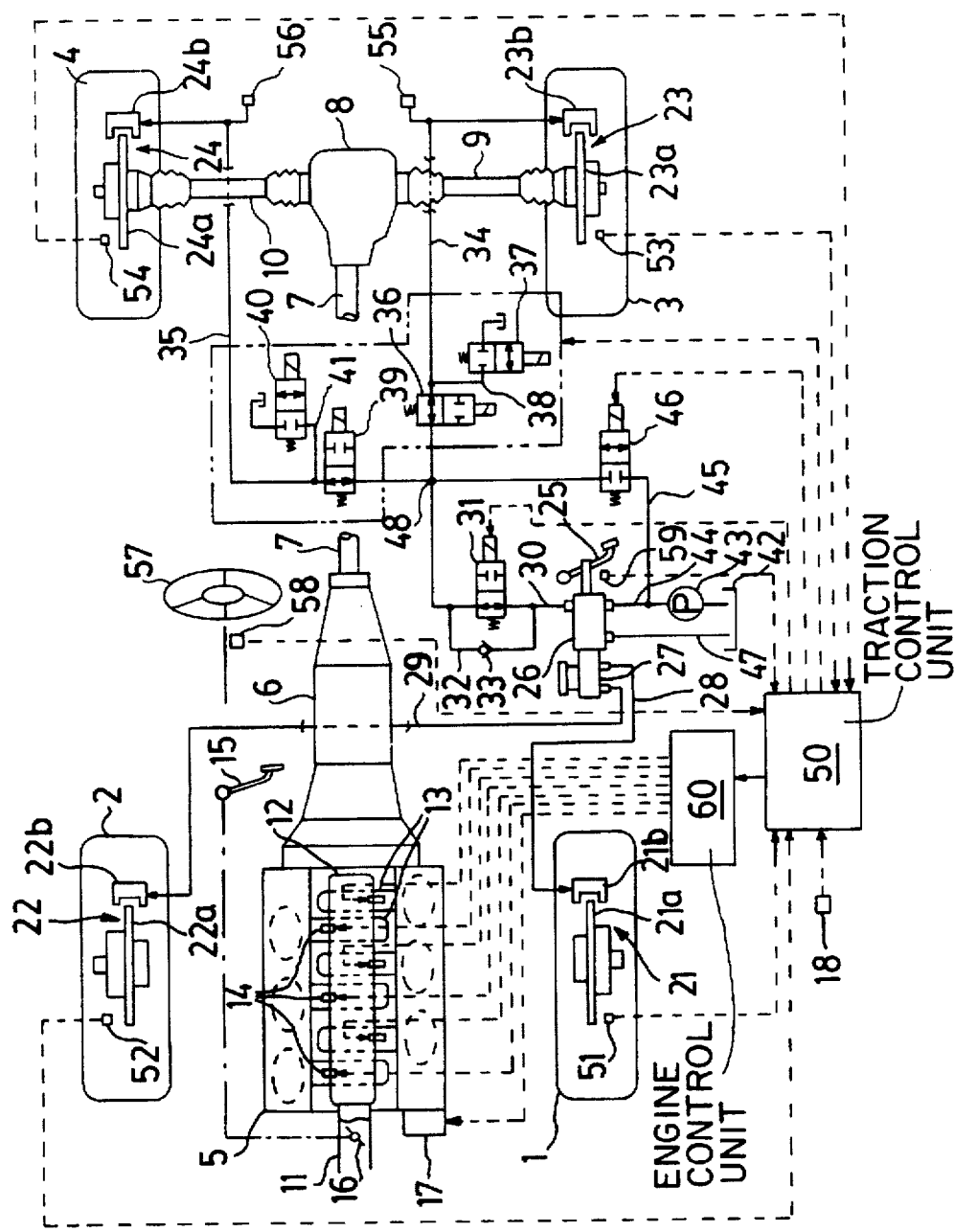
FIG. 1 is a schematic illustration of a front-engine, rear drive automotive vehicle incorporating a traction control system in accordance with a preferred embodiment of the present invention.

Referring now to the drawings in detail, and in particular, to FIG. 1, a front-engine, rear-drive automotive vehicle equipped with a traction control system in accordance with a preferred embodiment of the present invention has front wheels 1 and 2 as driven wheels and rear wheels 3 and 4 as driving wheels. Engine output from an engine 5 is connected to the rear wheels 3 and 4 through rear axles 9 and 10, respectively, via, from the front to the rear, an automatic transmission, including a torque converter and a planetary type of transmission gear, a propeller shaft 7 and a differential gear 8.

The engine 5 is a V-type six-cylinder internal combustion engine having left and right cylinder banks arranged in a V-formation with a predetermined relative angle. Above the engine 5 between the left and right banks, there is placed a surge tank 12 connected to an intake pipe 11. The surge tank 12 is provided with six discrete intake pipes 13. Each discrete intake pipe 13, which may be formed integrally with, or separately formed from and attached to, the surge tank 12, extends from one side of the surge tank 12 to another side so as to be connected to an intake port of one of the cylinders in one of the banks remote from the one side of the surge tank 12. The discrete intake pipes 13 are provided with fuel injectors 14, two for each intake pipe 13. Each fuel injector 14 is positioned so as to inject fuel into either the discrete intake pipe 13 or the related intake port (not shown). The intake pipe 11 is provided with a throttle valve 16 operationally coupled to an accelerator pedal 15.

A braking system of the automotive vehicle includes brake units 21, 22, 23 and 24 cooperating with the front and rear wheels 1, 2, 3 and 4, respectively. Each brake unit 21, 21, 23 or 24 includes a brake disk 21a, 22a, 23a or 24a rotatable together with the wheel 1, 2, 3 or 4 as one whole and a brake caliper 21b, 22b, 23b or 24b which is actuated with a brake oil so as to brake the brake disk 21a, 22a, 23a or 24a. Each of these brake units 21–24 cooperates with a pressure booster 26 which boosts pressure of the brake oil. A tandem type of master cylinder 27, to which the boosted brake oil is supplied, is connected to the calipers 21b and 22b of the front brake units 21 and 22 through oil pipes 28 and 29, respectively, which extend separately from the master cylinder 27. On the other hand, the pressure booster 26 is connected to the calipers 23b and 24b of the rear brake units 23 and 24 through oil pipes 34 and 35, respectively, which branch off from a main oil pipe 30 extending from the pressure booster 26. The main oil pipe 30 is provided with an electromagnetic valve 31 and a bypass oil pipe 32 bypassing the electromagnetic valve 31 and provided with a check valve 33 which allows the brake oil to flow only from the pressure booster 26 toward the calipers 23b and 24b. The oil pipe 34 is provided with an electromagnetic valve 36 and is connected, at a point downstream from the electromagnetic valve 36, to an electromagnetic valve 37 as a relief valve through an oil pipe 38. Similarly, the oil pipe 35 is provided with an electromagnetic valve 39 and is connected, at a point downstream from the electromagnetic valve 39, to an electromagnetic valve 40 as a relief valve through an oil pipe 41. All of these electromagnetic valves 36, 37, 39 and 40 are actuated by means of duty solenoids (not shown), respectively. The oil pipes 34 and 35 extending to the rear brake units 23 and 24 are provided with oil pressure sensors 55 and 56, respectively.

The pressure booster 26 is further connected to a brake oil reservoir tank 42 through an oil pipe 44 so as to be supplied with the brake oil pressurized by a pump 43. The oil pipe 44 is connected, at a point downstream from the pump 43, to an electromagnetic valve 46 through an oil pipe 45. An overflow of brake oil from the pressure booster 26 returns into the brake oil reservoir tank 42 by way of an oil pipe 47.

In order for the traction control unit 50 to perform engine traction control and brake traction control, there are provided various sensors and switches, such as speed sensors 51, 52, 53 and 54 for detecting speeds of the respective wheels 1, 2, 3 and 4, respectively, an angle sensor 59 for detecting a turned angle of a steering wheel 57, a brake switch which turns on in response to putting a foot on and pressing a brake pedal 25, and a speed sensor 18 for detecting a speed of the engine 5. The speed sensor 51–54 may be of a type having an electromagnetic pickup which detects electromagnetically a plurality of parts formed on the respective brake disks 21a–24a, or otherwise on rotatable members equivalent to the brake disks 21a–24a, and counts the detected number per unit time of detected parts, so as thereby to find speeds of the respective wheels 1–4. Various signals, such as wheel speed signals, brake oil pressure signals, a steering angle signal, a brake signal and an engine speed signal, are sent to the traction control unit 50 from the sensors 51–54, the oil pressure sensors 55–56, the angle sensor 58, the brake switch 59, and the speed sensor 18, respectively. On the other hand, the traction control unit 50 provides for an engine control unit 60 and the respective electromagnetic valves 31, 36, 37, 39, 40 and 46 various signals, such as an engine traction control signal and valve actuation signals. The engine control unit 60 controls the respective fuel injectors 14 so as to cut fuel supply according to the engine traction control signal and also control an igniter 17 of the engine so as to regulate retardation of ignition.

The traction control unit 50 includes various circuits, such as wave-form shaping circuits for the wheel speed signals and engine speed signal, AC-DC converters for the brake oil pressure signals and steering angle signal, an input-output interface, a microcomputer, drive circuits for the electromagnetic valves, and a plurality of timers. The microcomputer has a read only memory (ROM), which stores therein slippage control programs which will be described later and tables, and a random access memory (RAM) having various work memories.

Briefly describing the braking control, when the brake traction control is not conducted, the electromagnetic valve 31 is opened and the electromagnetic valve 46 is closed so as to allow the brake oil to flow into the brake units 21–24 by way of the pressure booster 26 during braking. On the other hand, when the brake traction control is conducted, after having closed the electromagnetic valve 31 and having opened the electromagnetic valve 46, the electromagnetic valves 36, 37, 39 and 40 are appropriately duty-controlled so as to regulate desirably the pressure of brake oil for the rear brake units 23 and 24.

In the engine traction control, namely the slippage control, which the traction control unit 50 performs, in addition to obtaining an actual radius of turn Rr, a radius of turn Ri corresponding to a steered angle (which is hereafter referred to as an expected turning radius), a vehicle speed V and a coefficient of road friction µ are obtained from the above-described speed signals and angle signal, a correction coefficient k is obtained and used for correcting a threshold value for judging wheel slippage and a target value for wheel slippage control. This correction coefficient k is established so as to change these threshold value and target value smaller with an increase in the lateral acceleration of vehicle body G. Thereafter, the traction control unit 50 performs a calculation of a wheel slippage amount (Sw), a judgement of wheel slippage, setting a target slippage amount (St), and a calculation of an engine control level on which engine output is controlled and provides for the engine control unit 60 a control signal by which the control of fuel-cut control and ignition retardation is caused so as to control slippage.

The operation of the traction control unit 50 will be best understood by reviewing FIGS. 2 through 8, which are flow charts illustrating various routines and subroutines for the microcomputer. Programming a computer is a skill well understood in the art. The following description is written to enable a programmer having ordinary skill in the art to prepare an appropriate program for the microcomputer. The particular details of any such program would of course depend upon the architecture of the particular computers selected.

Traction Control Main Routine

Figure 2:
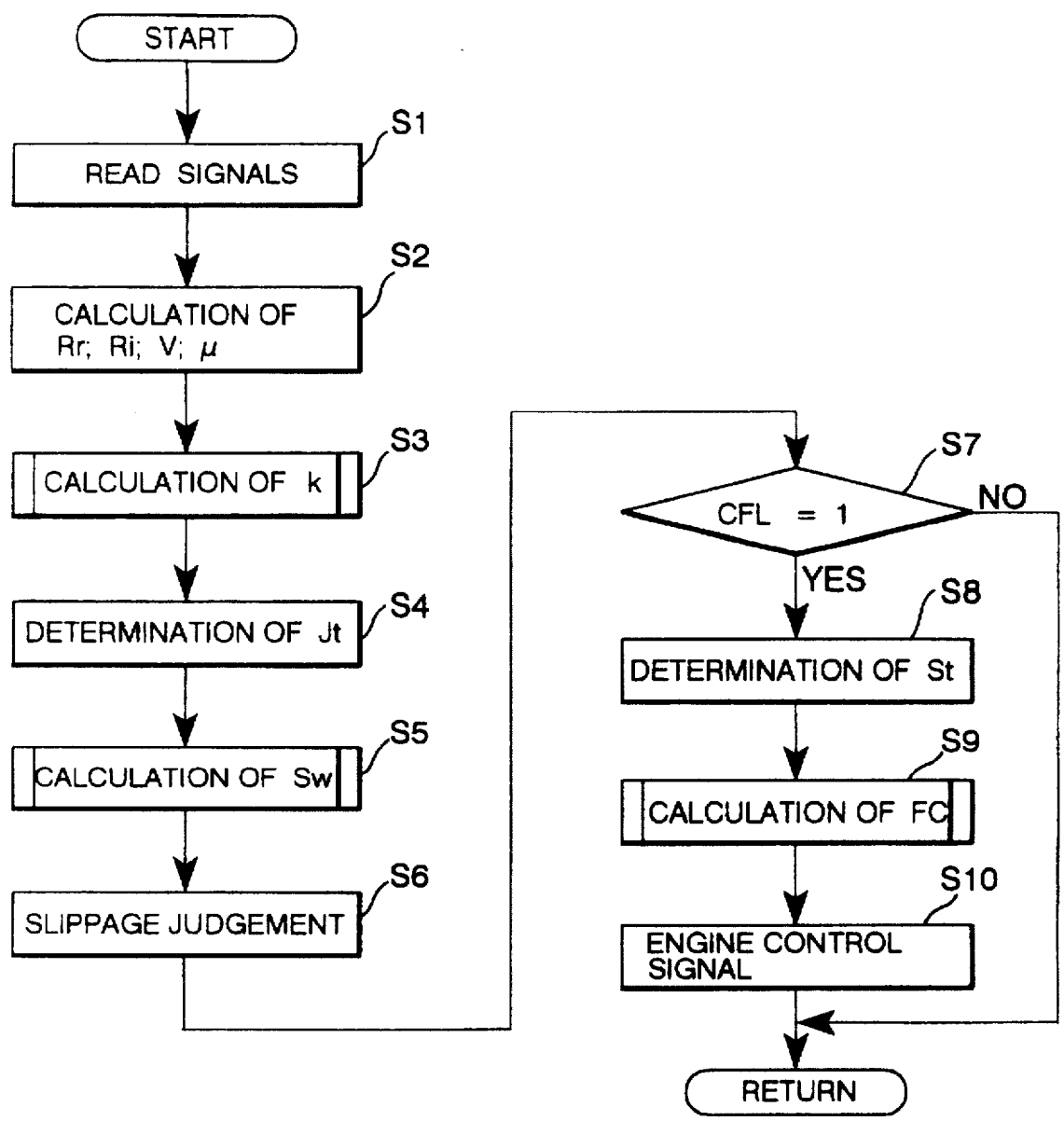
FIG. 2 is a flow chart illustrating a slippage control main routine.

Referring now to FIG. 2, which is a flow chart of the main or general sequence routine which is executed with short intervals of, for instance, 10 ms., the flow chart routine commences at the start of the engine 5 and, after having cleared the work memories of the RAM and provided an initial state, the slippage control passes to step S1 where various signals are read in from the sensors 51–54 and 58 and the switch 59. Then, at step S2, calculations are made to obtain various control factors, namely an actual turning radius Rr, an expected turning radius Ri, a vehicle speed V and a road friction coefficient µ.

In this instance, the actual turning radius Rr is calculated from the following formulas:

$$Rr = Min(V1, V2) \times Td + |V1 - V2| + 0.5Td \qquad (1)$$

where V1 and V2 are wheel speeds of the front driven wheels 51 and 52, respectively;

Min(V1, V2) represents a wheel speed which is smaller between the wheel speeds V1 and V2; and Td is a tread which is, for instance, 1.7 m.

The expected turning radius Ri is approximately equivalent to the radius of a turn caused by steering when a transmission is neutral and is obtained by linearly interpolating radii shown in the following expected turning radius table (I) based on absolute steering angles θ which are detected by the angle sensor 58.

| RADIUS TABLE | | | |
|---|---|---|---|
| |θ| | Ri (m) | |θ| | Ri (m) |
| 15° | 150 | 255° | 10 |
| 30° | 85 | 340° | 8 |
| 85° | 30 | 425° | 6 |
| 170° | 15 | 510° | 5 |

Either one of wheel speeds V1 and V2 of the front driven wheels which is greater than another is substituted for a vehicle speed V.

In order to perform the calculation of road friction coefficient µ, utilization of two, namely first and second, timers is made to count 100 ms. and 500 ms. Specifically, until the vehicle attains a sufficiently increased acceleration, that is, within a period of 500 ms. from the commencement of slippage control, the calculation of vehicle acceleration Vg is made every 100 ms. based on changes of the vehicle speed V in a period of 100 ms. by solving the following formula (2):

$$Vg = K1 \times [V(k) - V(k-100)] \qquad (2)$$

On the other hand, after a lapse of 500 ms., the calculation of vehicle acceleration Vg is made every 100 ms. based on changes of the vehicle speed V in a period of 500 ms. by solving the following formula (3):

$$Vg = K2 \times [V(k) - V(k-500)] \qquad (3)$$

A road friction coefficient µ is calculated in a three order interpolation by use of these vehicle speed and vehicle acceleration Vg thus obtained and the following road friction coefficient table:

ROAD FRICTION COEFFICIENT TABLE

| | | 0 | | | Vg | | | | Large |
|---|---|---|---|---|---|---|---|---|---|
| | 0 | 1.0 | 1.0 | 2.0 | 2.0 | 3.0 | 3.0 | 4.0 | 4.0 | 5.0 |
| | | 1.0 | 1.0 | 2.0 | 2.0 | 3.0 | 4.0 | 4.0 | 5.0 | 5.0 |
| | | 1.0 | 1.0 | 2.0 | 3.0 | 3.0 | 4.0 | 4.0 | 5.0 | 5.0 |
| V | | 1.0 | 1.0 | 2.0 | 3.0 | 4.0 | 4.0 | 5.0 | 5.0 | 5.0 |
| | | 1.0 | 1.0 | 2.0 | 3.0 | 4.0 | 5.0 | 5.0 | 5.0 | 5.0 |
| | | 1.0 | 1.0 | 2.0 | 4.0 | 4.0 | 5.0 | 5.0 | 5.0 | 5.0 |
| | | 1.0 | 2.0 | 3.0 | 4.0 | 5.0 | 5.0 | 5.0 | 5.0 | 5.0 |
| Large | | 1.0 | 2.0 | 3.0 | 5.0 | 5.0 | 5.0 | 5.0 | 5.0 | 5.0 |

Thereafter, at step S3, a subroutine is called for so as to perform calculations of a lateral acceleration G and a correction coefficient k relating to the lateral acceleration G. The lateral acceleration G is determined based on the radius of turning and the speed of vehicle. In this instance, an actual turning radius Rr and an expected turning radius Ri are selectively substituted for the radius of turning. Specifically, the actual turning radius Rr is selected when a swerve tendency is relatively small and, on the other hand, the expected turning radius Ri is selected when the swerve tendency is not small. The term "swerve tendency" as used herein shall mean and refer to the tendency that a vehicle swerves from a cornering route defined by the expected turning radius Ri. The swerve tendency is judged based on road conditions and driving conditions.

Correction Coefficient Calculation Subroutine

Figure 3:
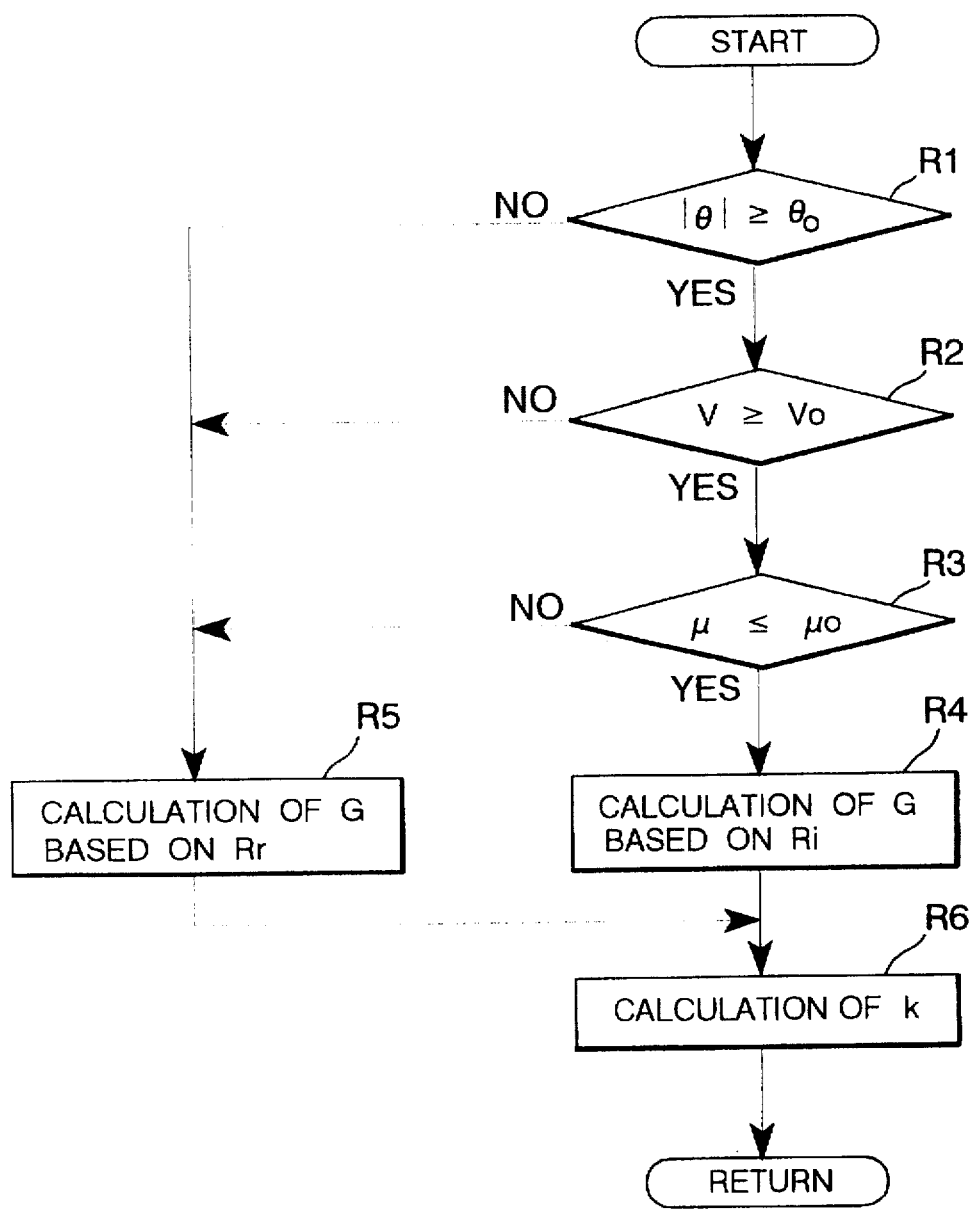
FIG. 3 is a flow chart illustrating a correction coefficient calculation subroutine.

Referring to FIG. 3, which is a flow chart of the correction coefficient calculation subroutine, decisions are made as to an absolute steering angles θ, a vehicle speed V and a road friction coefficient μ at steps R1, R2 and R3, respectively. If the absolute steering angles θ and the vehicle speed V are equal to or larger than a predetermined angle $θ_O$ and a predetermined speed $V_O$, respectively and the road friction coefficient μ is equal to or smaller than predetermined road friction coefficient $μ_O$, i.e. all of the answers to the decisions made at steps R1, R2 and R3 are "YES," then, at step R4, a lateral acceleration G is calculated based on the expected turning radius Ri. On the other hand, if the absolute steering angles θ and the vehicle speed V are not larger than a predetermined angle $θ_O$ and a predetermined speed $V_O$, respectively and the road friction coefficient μ is not smaller than predetermined road friction coefficient $μ_O$, i.e. all of the answers to the decisions made at steps R1, R2 and R3 are "NO," then, at step R5, a lateral acceleration G is calculated based not on the expected turning radius Ri but on the actual turning radius Rr.

The lateral acceleration G is obtained by solving the following formula:

$$G = V \times V \times (1/R) \times (1/127) \quad (4)$$

Subsequently, at step R6, a correction coefficient k is calculated in a linear interpolation based on the lateral acceleration G from the following correction coefficient table.

CORRECTION COEFFICIENT TABLE

| G | k | G | k |
|---|---|---|---|
| 0 | 1 | 0.7 | 0.6 |
| 0.1 | 0.9 | 0.9 | 0.5 |
| 0.3 | 0.8 | 1.0 | 0 |
| 0.5 | 0.7 | — | — |

The final step orders return to the main routine, after the step in the main routine calling for the correction coefficient calculation subroutine.

Traction Control Main Routine—Continued

Referring back to the traction control main routine in FIG. 2, a threshold value Jt is determined for judging slippage at step S4. The judging threshold value Jt is obtained as a product of a basic threshold value $Jt_O$ and a correction coefficient k. The basic threshold value $Jt_O$ is calculated in a three order interpolation by use of the vehicle speed V and road friction coefficient μ as parameters from the following basic threshold value tables (I) or (II):

BASIC THRESHOLD VALUE TABLE (I)

| | | 0 | | V | | | Large |
|---|---|---|---|---|---|---|---|
| | 1 | +10 | +9 | +7 | +6 | +5 | +4 |
| | 2 | +11 | +10 | +9 | +8 | +7 | +6 |
| μ | 3 | +12 | +11 | +10 | +9 | +8 | +7 |
| | 4 | +13 | +12 | +11 | +10 | +9 | +8 |
| | 5 | +14 | +13 | +12 | +11 | +10 | +9 |

BASIC THRESHOLD VALUE TABLE (II)

| | | 0 | | V | | | Large |
|---|---|---|---|---|---|---|---|
| | 1 | +3 | +3 | +2 | +2 | +1 | +1 |
| | 2 | +4 | +4 | +3 | +3 | +2 | +2 |
| μ | 3 | +5 | +5 | +4 | +4 | +3 | +3 |
| | 4 | +6 | +6 | +5 | +5 | +4 | +4 |
| | 5 | +7 | +7 | +6 | +6 | +5 | +5 |

The table (I) and (II) are used for judging whether the slippage control should be commenced and whether the slippage control should be continued, respectively. After the determination of a basic threshold value $Jt_O$, a subroutine is called so as to perform calculation of slippage (a wheel slippage amount Sw) at step S5.

Wheel Slippage Amount Calculation Subroutine

Figure 4:
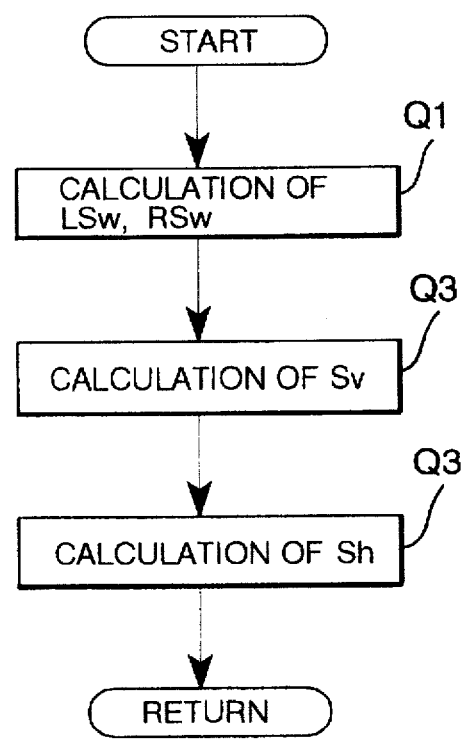
FIG. 4 is a flow chart illustrating a wheel slippage amount calculation subroutine.

Referring to FIG. 4, which is a flow chart of the wheel slippage amount calculation subroutine, wheel slippage amounts LSw and RSw of the left and right rear wheels 3 and 4 are obtained as differences of wheel speeds V3 and V4 of the left and right wheels 3 and 4 from a vehicle speed V, respectively, at step Q1. Subsequently, an average rear wheel slippage amount Sv is calculated as an arithmetical mean of these wheel slippage amounts LSw and RSw at step Q2. Finally, either one of the wheel slippage amounts LSw and RSw which is greater than another is taken as the highest wheel slippage amount Sh at step Q3. The final step orders return to the main routine, after the step in the main routine calling for the correction coefficient calculation subroutine.

Traction Control Main Routine—Continued

Referring back to the traction control main routine in FIG. 2, at step S6, a judgement of slippage is made. In this slippage judgement, if the highest slippage amount Sh satisfies the following condition (5), i.e. it is equal to or higher than the judging threshold value Jt, a slippage control flag CFL is set to a state of 1 which indicates that the slippage control is necessary.

$$Sh \geq Jt \tag{5}$$

In this instance, if the slippage control flag CFL has been set to a state of 0, which indicates that the slippage control is not in progress, in a control level determination subroutine taking place later in a control level calculation subroutine at step S9, the basic threshold values of table (I) are used in order to determine the judging threshold value Jt for the commencement of slippage control. On the other hand, if the slippage control flag CFL has been set to the state of 1, the basic threshold values of table (II) are used in order to determine the judging threshold value Jt for the continuation of slippage control.

Subsequently, at step S7, a decision is made as to whether the slippage control flag CFL has been set to the state of 1. If the answer to the decision is "NO," then, the traction control main routine returns directly and restarts. On the other hand, if the answer to the decision is "YES," this indicates that slippage control is in progress, then, at step S8, a target slippage amount St for the rear wheels 3 and 4 is determined. In order to calculate the target slippage amount St, a basic target slippage amount $St_O$ is calculated in a three order interpolation by use of the vehicle speed V and road friction coefficient μ as parameters from the following basic target slippage amount table.

| BASIC TARGET SLIPPAGE AMOUNT TABLE | | | | | | |
|---|---|---|---|---|---|---|
|   | 0 |   | V |   |   | Large |
| μ 1 | +5.0 | +4.0 | +3.0 | +3.0 | +3.0 | +3.0 |
| 2 | +5.0 | +4.0 | +4.0 | +3.0 | +3.0 | +3.0 |
| 3 | +5.0 | +4.0 | +4.0 | +4.0 | +3.0 | +3.0 |
| 4 | +6.0 | +5.0 | +5.0 | +4.0 | +4.0 | +4.0 |
| 5 | +6.0 | +5.0 | +5.0 | +5.0 | +4.0 | +4.0 |

Then, the target slippage amount St is calculated by solving the following equation:

$$St = St_O \times k \tag{6}$$

After the calculation of a target slippage amount St, a subroutine is called for so as to perform calculation of a control level FC at step S9. The control level FC is determined based on a basic control level $FC_O$ which is obtained based on the deviation EN of average rear wheel slippage amount Sv from a target slippage amount St and the change DEN in slippage deviation as shown in the following basic control level table.

| BASIC CONTROL LEVEL TABLE | | | | | | | |
|---|---|---|---|---|---|---|---|
|   | − |   | DEN(g) |   |   |   | + |
| Small | −3 | −2 | −1 | −1 | 0 | +1 | +1 |
|   | −3 | −1 | −1 | 0 | 0 | +1 | +1 |
|   | −2 | −1 | −1 | 0 | 0 | +1 | +1 |
| EN | −2 | −1 | 0 | 0 | +1 | +1 | +1 |
| (Km/h) | −2 | −1 | 0 | 0 | +1 | +1 | +2 |
|   | −1 | −1 | 0 | 0 | +1 | +1 | +2 |
|   | −1 | 0 | 0 | +1 | +1 | +1 | +2 |
|   | −1 | 0 | 0 | +1 | +1 | +1 | +2 |
| Large | −1 | 0 | 0 | +1 | +1 | +2 | +2 |

The control level FC is actually determined between levels 0 and 15 by tempering the basic control level $FC_O$ with a first correction and a feedback correction of the last control level FC(k−1). The first correction is +5 until a change DSv in the average rear wheel slippage amount Sv (which is hereafter referred to as an average rear wheel slippage change DSv) reaches 0 (zero) for the first time and +2 a first flag STFL is set to a state of 0.

Control Level Determination Subroutine

Figure 5:
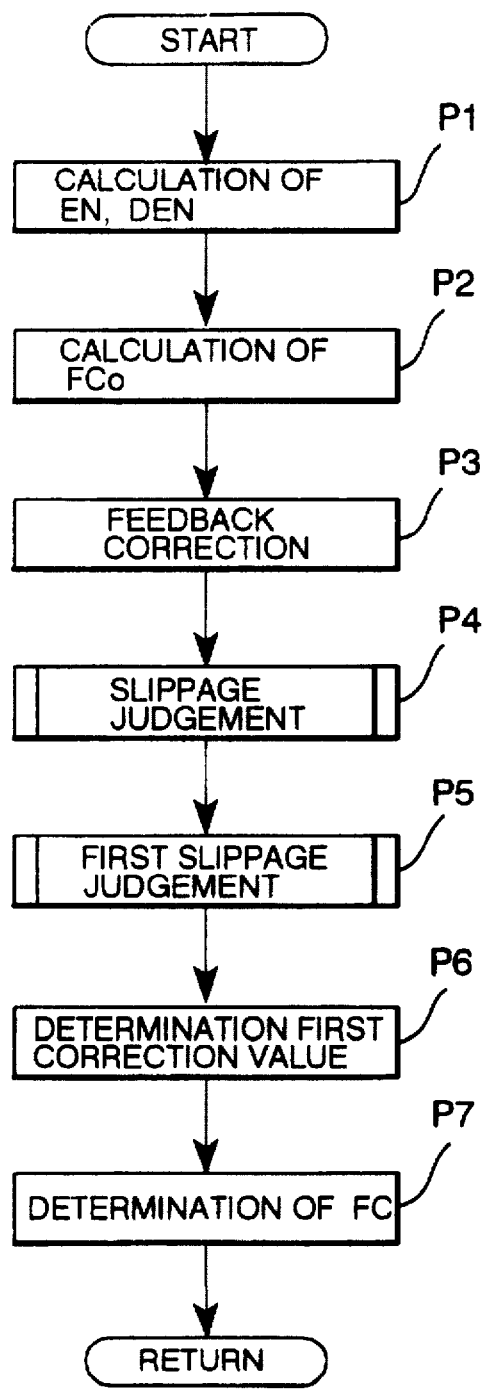
FIG. 5 is a flow chart illustrating a control level determination subroutine.

Referring to FIG. 5, which is a flow chart of the control level determination subroutine, at step P1, the slippage deviation EN of average rear wheel slippage amount Sv from a target slippage amount St and a slippage deviation change DEN are calculated from the following equations, respectively:

$$EN = Sv(k) - St \tag{7}$$

$$DEN = DSv = Sv(k) - Sv(k-1) \tag{8}$$

Subsequently, at step P2, a current basic control level $FC_O(k)$ is determined based on these slippage deviation EN and slippage deviation change DEN from the basic control level table. After having executed, at step P3, a feedback correction where the current basic control level FC(k) is obtained by adding the last control level FC(k−1) to the current basic control level $FC_O(k)$, a slippage judgement subroutine is called for at step P4 so as to execute a slippage judgement.

Slippage Judgement Subroutine

Figure 6:
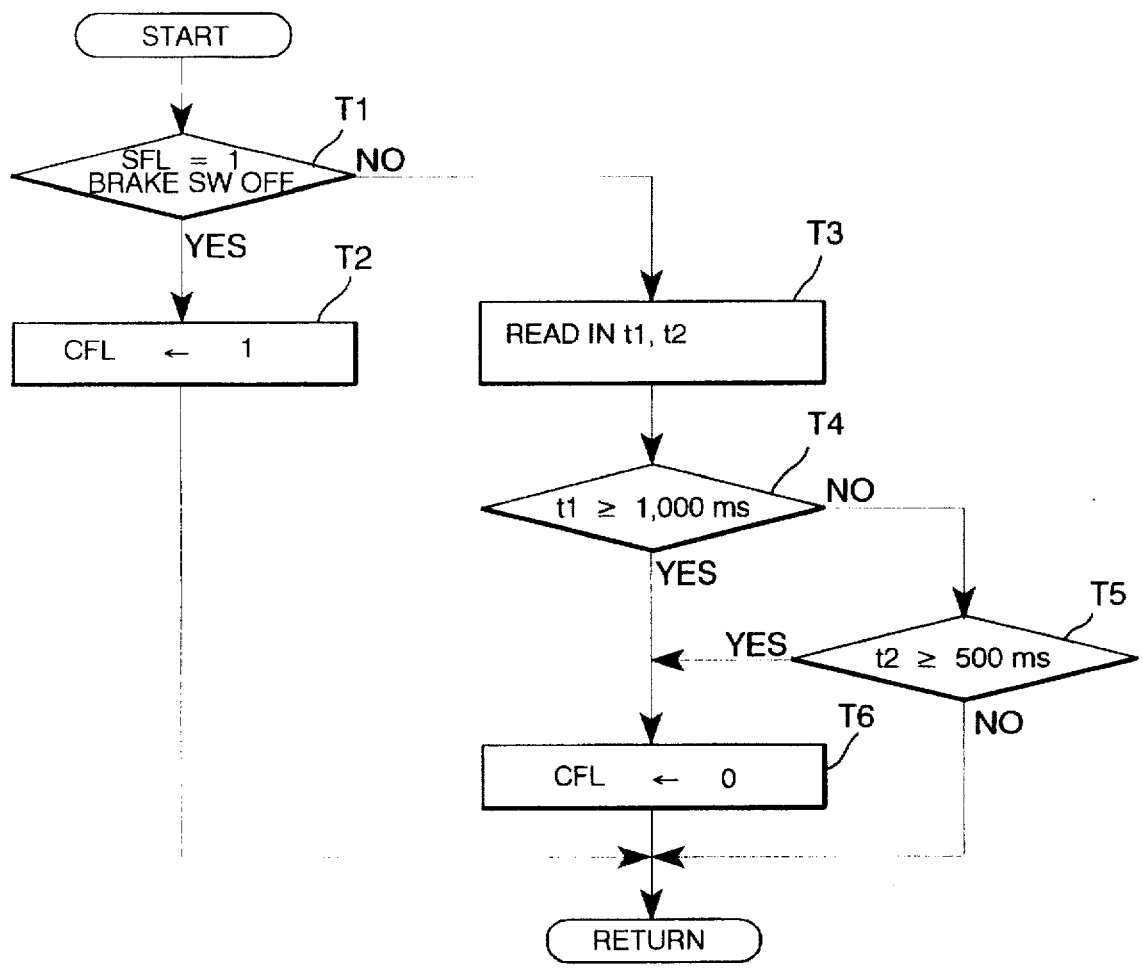
FIG. 6 is a flow chart illustrating a slippage judgement subroutine.

Referring to FIG. 6, which is a flow chart of the slippage judgement subroutine, the first step T1 is to make a decision as to whether a slippage flag SFL has been set to a state of 1 without applying brake. The application of brake is detected by the existence of a brake signal from the brake switch 59. If the answer to the decision is "YES," after having set the slippage control flag CFL to the state of 1 at step T2, the step orders return to the main routine, after the step in the control level calculation subroutine calling for the slippage judgement subroutine. On the other hand, if the answer to the decision is "NO," then, timer counts T1 and t2 are read at step T3. In this instance, the count t1 counted by the first timer is indicative of a continuous time of the state of 0 of the slippage flag SFL. The count t2 counted by the second timer is indicative of a continuous time for which the average rear wheel slippage change DSv satisfies the condition that it is equal to or smaller than 0.3 g with the control level FC equal to or lower than a level of 3, on which the slippage control is terminated. Subsequently, at step T4, a decision is made as to whether the first timer has counted a count t1 equal to or larger than 1,000 ms. If the answer is "NO," then, another decision is made at step T5 as to whether the second timer has counted a count t2 equal to or larger than 500 ms. When the answer to the decision made at step T5 is "NO," or after setting the slippage control flag CFL to the state of 0 at step T6 when the answer to each of the decisions made at steps T4 and T5 is "YES," the final step orders return to the control level determination subroutine, after the step in the control level determination subroutine calling for the slippage judgement subroutine.

Control Level Determination Subroutine— Continued

Referring back to the control level determination subroutine in FIG. 5, at step P5, a first slippage judgement subroutine is called for.

First Slippage Judgement Subroutine

Figure 7:
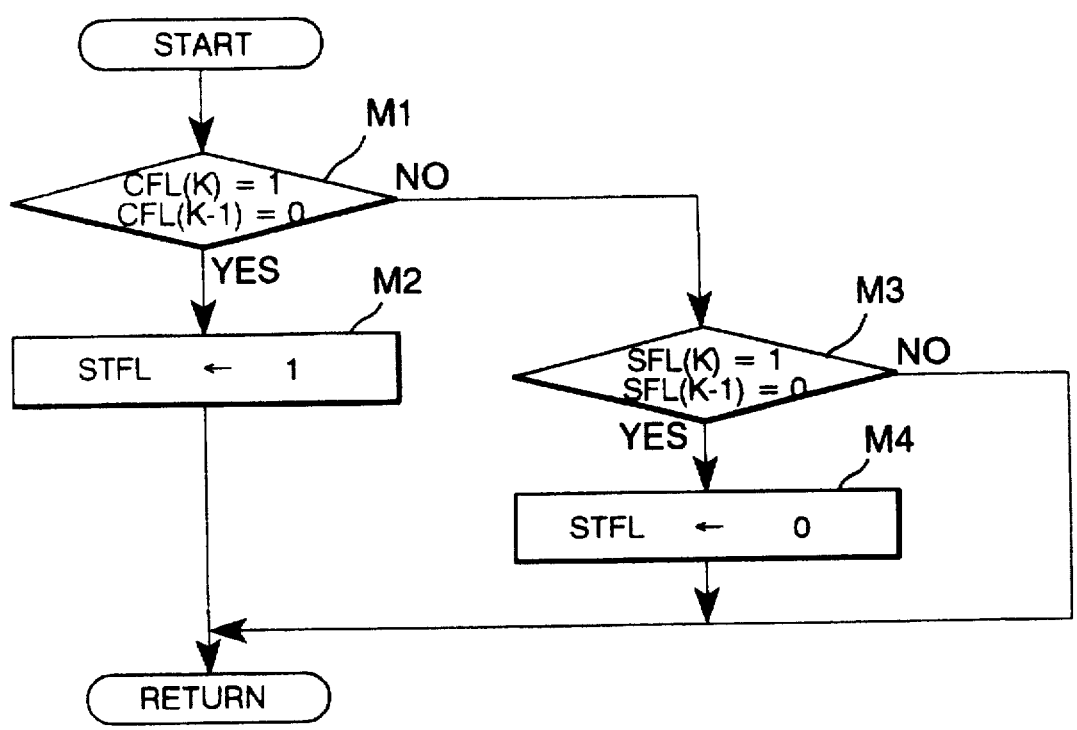
FIG. 7 is a flow chart illustrating a first slippage judgement subroutine.

Referring to FIG. 7, which is a flow chart of the first slippage judgement subroutine, the first step M1 is to make a decision as to the states of the slippage control flag CFL in the last (k-1) and current (k) executions of the traction control. If the slippage control flag CFL was in the state of 0 in the last traction control routine (k-1) and is in the state of 1 in the current traction control routine (k), i.e. the answer to the decision is "YES," then, the first slippage flag STFL is set to the state of 1 at step M2. On the other hand, if the answer to the decision made at step M1 is "NO," then, another decision is made at step M3 as to the states of the slippage flag SFL in the last (k-1) and current (k) executions of the traction control. If the slippage flag CFL was in the state of 0 in the last traction control routine (k-1) and is in the state of 1 in the current traction control routine (k), i.e. the answer to the decision is "YES," then, the first slippage flag STFL is set to the state of 0 at step M4. When the first slippage flag STFL has been set to either state at step M2 or M4, or otherwise when the answer to the decision made at step M3 is "NO," the final step orders return to the control level determination subroutine, after the step in the control level determination subroutine calling for the first slippage judgement subroutine.

Control Level Determination Subroutine— Continued

Referring back to the control level determination subroutine in FIG. 5, at step P6, a first correction value is determined to be +2 when the first slippage flag STFL has been set to the state of 1 and the average rear wheel slippage change DSv is less than 0 (zero). Thereafter, at step P7, a decisive control level FC is determined by tempering the current control level FC(k), obtained in the feedback correction, with, if having been provided, the first correction value. The final step orders return to the main routine, after the step in the main routine calling for the control level determination subroutine.

Traction Control Main Routine—Continued

Figure 9:
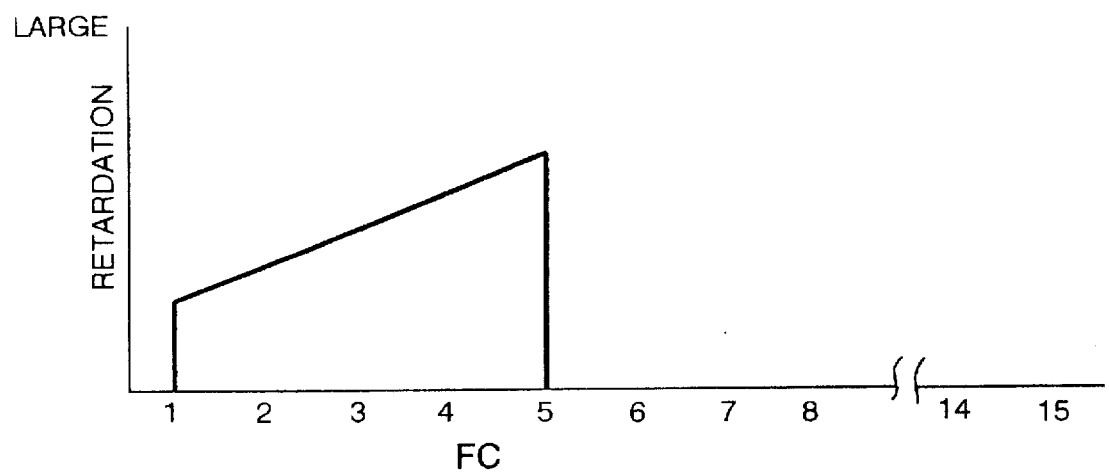
FIG. 9 is a map of retardation relating to control level.
Figure 10:
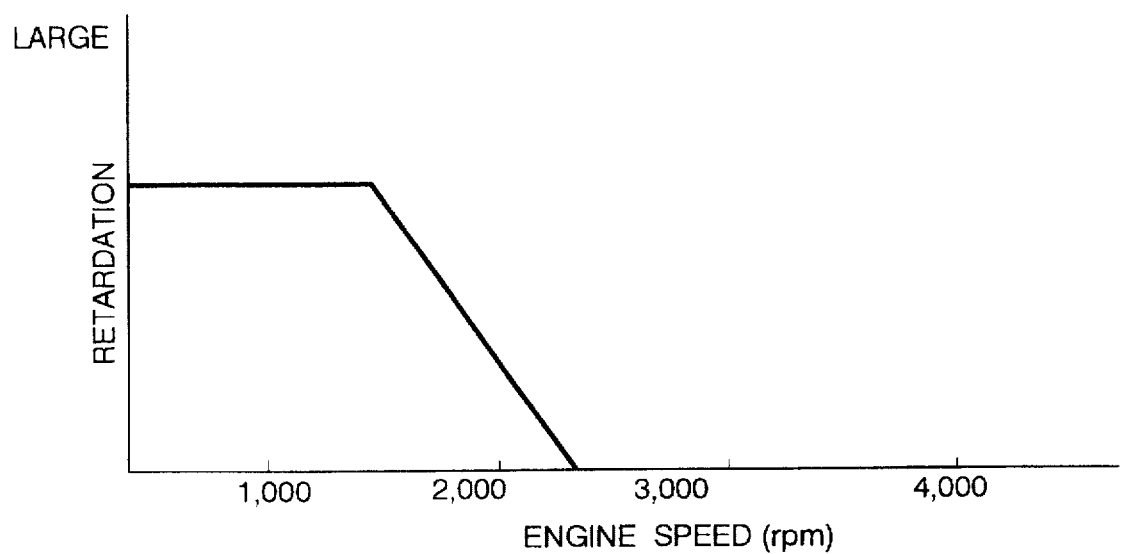
FIG. 10 is a map of upper limits of ignition retardation relating to engine speed.

Referring back again to the traction control main routine in FIG. 2, at step S10, slippage control signals indicating the retardation of ignition and a fuel-cut pattern are provided for the engine control unit 60. The amount of ignition retardation is read from a retardation map shown in FIG. 9 based on the decisive control level FC. Upper limits are previously established on the ignition retardation according to engine speeds and mapped as shown in FIG. 10. As understood in FIG. 10, an upper limit of ignition retardation is kept lower in a range of high engine speeds. FIG. 11 shows a fuel-cut map, defined by engine speed and decisive control level FC, in which a fuel-cut range is shaded.

Various fuel-cut patterns are previously determined as shown below. In the following table, the injector indicated by a sign x is under interruption in fuel injection. In the fuel-cut pattern 0, all of the fuel injectors 1–12 are alive. In the fuel-cut patterns 1, 3, 5, 7, 9 and 11, either one of the two fuel injector 14 is interrupted from fuel injection into one of the six cylinders. In the fuel-cut patterns 2, 4, 6, 8 and 10, one or more cylinders are not supplied with fuel at all. In particular, in the fuel-cut pattern 6, all cylinders in either one of the left and right cylinder banks are not supplied with fuel at all. In the fuel-cut pattern 12, all of the fuel injectors 1–12 are interrupted from fuel injection.

FUEL-CUT PATTERN TABLE

| Pattern | Injector No. | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| 1 |   |   |   |   |   |   |   |   |   |   |   |   |
| 2 | x |   |   |   |   |   | x |   |   |   |   |   |
| 3 | x |   |   |   |   |   | x |   |   |   |   |   |
| 4 | x |   |   | x |   |   | x |   |   | x |   |   |
| 5 | x | x |   | x |   |   | x |   |   | x |   |   |
| 6 | x | x |   | x |   |   | x | x |   | x |   |   |
| 7 | x | x |   | x | x |   | x | x |   | x |   |   |
| 8 | x | x |   | x | x |   | x | x |   | x | x |   |
| 9 | x | x | x | x | x |   | x | x |   | x | x |   |
| 10 | x | x | x | x | x |   | x | x | x | x | x |   |
| 11 | x | x | x | x | x | x | x | x | x | x | x |   |
| 12 | x | x | x | x | x | x | x | x | x | x | x | x |

Figure 14:
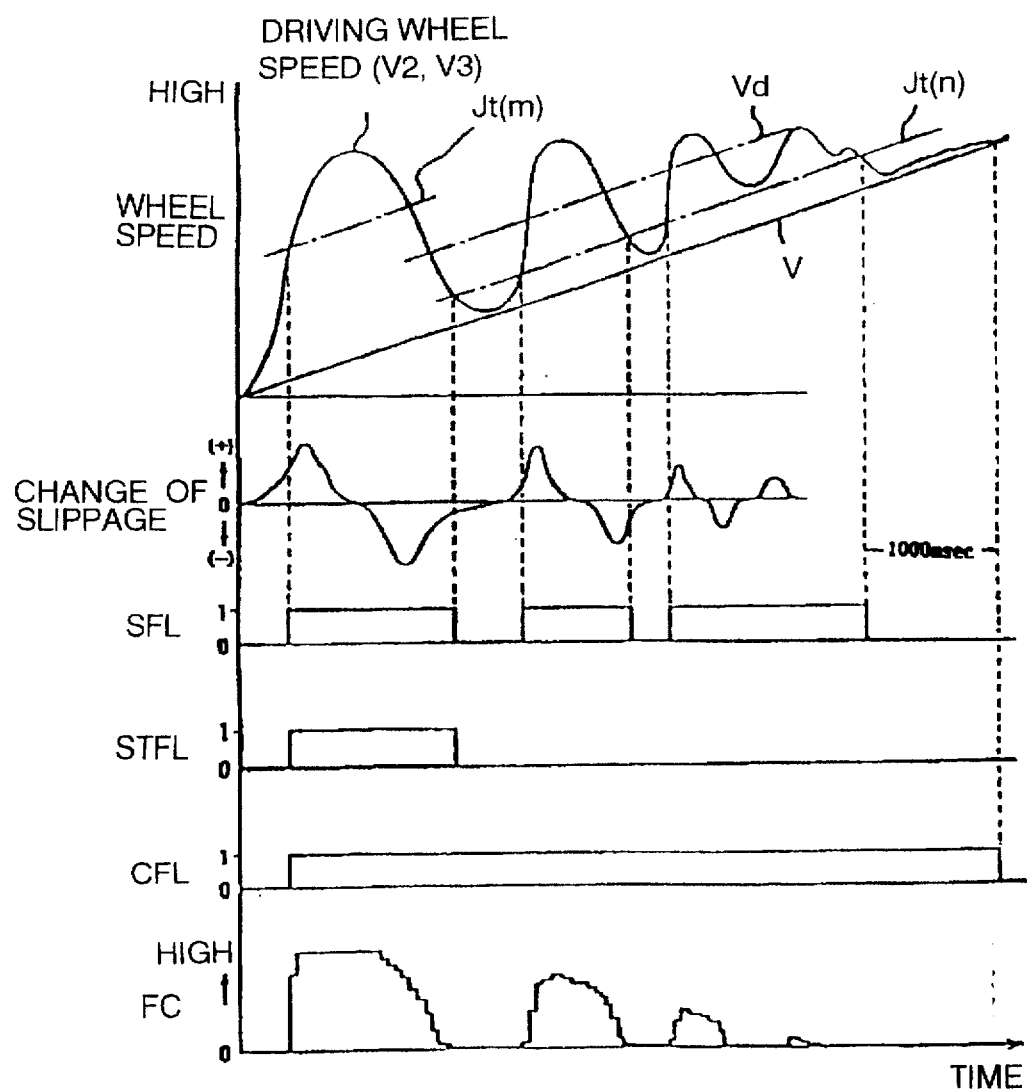
FIG. 14 is a time chart of slippage control.

As shown by a time chart in FIG. 14, the threshold value Jt(m) for the commencement of the slippage control is set relatively higher so as to prevent the slippage control from being performed until the driving wheel speed Vd increases excessively higher to exceed the threshold value Jt(m) due, for instance, to external disturbances. The slippage control commences when the driving wheel speed Vd exceeds the threshold value Jt(m) and accordingly, the slippage flag SFL is set to the state of 1, or when brake is not applied and, as a result, the slippage control flag CFL and first slippage flag STFL are set to the state of 1. Because of tempering the control level with a first correction in the period where the first slippage flag STFL is in the state of 1, slippage declines rapidly. Thereafter, the slippage control is continued and decreases slippage so as to lower the driving wheel speed Vd below the threshold value Jt(n) for the continuation of the slippage control. When slippage converges sufficiently to satisfy the condition of termination of the slippage control, the slippage control is terminated with resetting the slippage control flag CFL to the state of 0 (zero).

Figure 8:
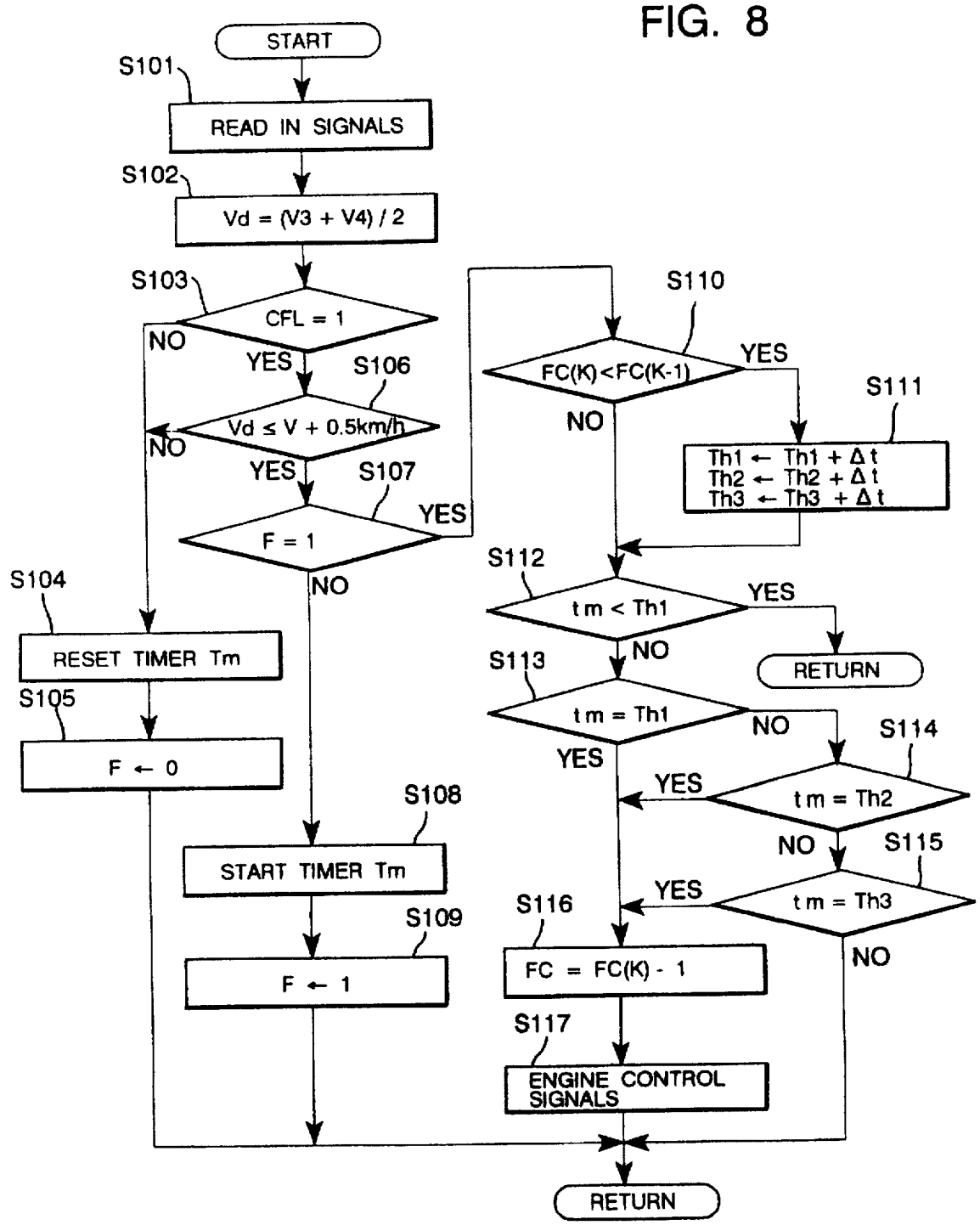
FIG. 8 is a flow chart illustrating an interrupt routine of correction restraint in a state of low slippage.

FIG. 8 shows a flow chart illustrating an interrupt routine of the control of control level correction and correction restraint in a state of low slippage, which is peculiar to the present invention. This interrupt routine is performed as a part of slippage control and, accordingly, called for every short interval of, for instance, 10 ms. between executions of the main routine shown in FIG. 2.

Briefly describing the correction control of control level FC, if the vehicle travels transitionally from a road with a low friction coefficient to a road with a high friction coefficient while the slippage control is continually taking place, since slippage of the rear driving wheels 3 and 4 have been controlled to the utmost through the slippage control, the rear driving wheels 3 and 4 experience slippage sufficiently lower to develop their speeds V1 and V2 proximately to wheel speeds V1 and V2 of the front driven wheels 1 and 2. In order to prevent a poor acceleration with such a low slippage state, a decisive control level FC is changed by a decrement of "1" whenever a low slippage period of time (which is hereafter referred to as a low slippage time) tm reaches threshold times Th1, Th2 and Th3 of, for instance, 250 ms., 1,000 ms., and 2,000 ms., respectively. By performing the engine control with the increased decisive control level, the engine output is boosted so as to prevent the vehicle from poor acceleration. In this instance, the term "low slippage time tm" used herein shall means and refer to a period of time for which a low slippage state is continuously kept and which is counted by a timer Tm.

While it is possibly coincidentally caused in a continuation period of low slippage state that the control level FC is decreasingly corrected through the feedback control of slippage which takes place in the main routine shown in FIG. 2, nevertheless, the correction restraint control prevents engine output from being excessively developed even if such a decreasing correction of the control level FC takes place.

The interrupt routine commences and passes directly a function block at step S101 where various signals are read in. These signals include at least driving wheel speeds V3 and V4, a vehicle speed V, the state of the slippage control flag CFL, a low slippage time tm counted by a timer Tm, which will be described later, threshold times Th1, Th2 and Th3, which are read in from a table and stored in a memory at the commencement of the main traction control routine, a last control level FC(k−1), and a current control level FC(k) and the state of a timer flag F. The timer flag F indicates that the timer Tm is counting a low slippage time tm when it is in the state of 1 and that the timer Tm has reset the count of time tm when it is in the state of 0 (zero).

After having calculated an average rear wheel speed Vd is calculated as an arithmetical mean of the left and right rear wheel speeds V3 and V4 at step S102, a decision is made at step 103 as to whether the slippage control flag CFL has been set to the state of 1. If the answer to the decision is "YES," a decision is made at step S106 as to whether there has occurred a low slippage state. It is decided to be in a low slippage state when the average rear wheel speed Vd satisfies the following condition:

$$Vd \leq V+0.5 \ Km/h \qquad (9)$$

If the average rear wheel speed Vd satisfies the condition (9), another decision is made at step S107 as to whether the timer flag F has been set to the state of 1. If the answer to the decision made at step S103 or at step S106 is "NO," then, after having reset the count tm of the timer Tm at step S104 and subsequently the timer flag F to the state of 0 (zero) at step S105, the interrupt routine returns.

If the answer to the decision concerning the timer flag F made at step S107 is "NO," then, after having started the timer Tm to count a low slippage time tm at step S108 and subsequently set the timer flag F to the state of 1 at step S109, the interrupt routine returns.

On the other hand, if the answer to the decision made at step S107 is "YES," this indicates that a low slippage state is continued, then, at another interruption, another decision is subsequently made at step S110 as to whether the current control level FC(k) is less than the last control level FC(k−1), i.e. whether boosting of engine output has been made through the feedback control of slippage in the traction control main routine. If the answer to the decision is "YES," the respective threshold times Th1, Th2 and Th3 are greatly changed by an increment of a time Δt of, for instance, 250 ms. at step S111. The reason of changing the respective threshold times Th1, Th2 and Th3 is to restrain the control level correction so as to prevent the engine output from developing excessively whenever the engine output has actually been boosted through the feedback control of slippage in the traction control main routine.

After having changed the respective threshold times Th1, Th2 and Th3 at step S111 or when the answer to the decision made at step S110 is "NO," another decision is made at step S112 as to whether a low slippage time tm that the timer Tm has counted is less than the threshold time Th1. If the low slippage time tm is less than the threshold times Th1, the interrupt routine returns. The timer Tm continues to count a low slippage time tm with passage of time. When the timer Tm counts a low slippage time tm equal to the threshold time Th1, Th2 or Th3, at step S113, S114 or S115, the current control level FC(k) is changed by a decrement of "1" as a decisive control level FC at step S116. Subsequently, at step S117, an engine control signal is provided based on the decisive control level FC for the engine control unit 60. After having provided the engine control signal at step S117, or as long as the low slippage time tm is not equal to any one of the threshold times Th1, Th2 and Th3, the interrupt routine returns.

In the interrupt routine depicted in FIG. 8, as shown in FIG. 12, when a low slippage time tm, for which the average driving wheel speed Vd is close to the vehicle speed V which is represented by driven wheel speeds, reaches the threshold time Th1, the current control level FC(k) is changed to a control level of [FC(k)−1] as a decisive control level FC and an engine control signal is provided based on the decisive control level FC so as to cause an increase in engine output. Thereafter, whenever the low slippage time tm reaches the threshold time Th2 or Th3, an increase in engine output is provided in the same manner. In such a way, poor acceleration in any low slippage state is eliminated and, as a result, sure acceleration is achieved.

If an increase in engine output is made as a result of decreasingly changing a current control level through the slippage control in the traction control main routine during a continuation of the low slippage state, each of the threshold times Th1, Th2 and Th3 is changed by an increment of the time Δt at step S111 whenever engine output is increased so as to decreasingly change the control level FC(k), i.e. to restrain the correction for increasing engine output. This prevents an excessive or double enhancement of engine output.

Whereas, in the above-embodiment, the time Δt by which each of the threshold times Th1, Th2 and Th3 is increased is established independently from engine speeds, nevertheless, it may be changed such that it becomes smaller from 250 to 100 ms. with an increase in engine speed. This is because, in the case where engine output is controlled by fuel cut, an alteration of fuel-cut pattern reflects effectively on engine output only after several revolutions of the engine crankshaft. In place of changing the threshold times Th1, Th2 and Th3 by the time Δt, it may be done to subtract the time Δt from the low slippage time tm the timer Tm has counted, or otherwise to halt the timer Tm for the time Δt. Further, in place of changing the threshold times Th1, Th2 and Th3 by the time Δt, it may be done to provide an engine control signal with a delay of the time Δt at step S117 in the interrupt routine.

Either one of rear driving wheel speeds V3 and V4 may be substituted for the average driving wheel speed Vd.

The engine control signal may be provided not in the interrupt routine but in the traction control main routine. Furthermore, the interrupt routine may be executed as a part of the traction control main routine.

Whereas the traction control system of the present invention has been described in connection with a rear-drive vehicle, nevertheless, it may be incorporated in any type of front-drive vehicles.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A traction control system for an automotive vehicle for controlling output of an engine so as to bring slippage of driving wheels close to target slippage, said traction control system comprising:

speed sensor means for detecting a wheel speed of each of driving and driven wheels of the automotive vehicle;

traction control means for calculating a target amount of slippage based on said wheel speeds of said driven wheels, calculating an actual amount of slippage of said driving wheels based on said wheel speeds of said driving and driven wheels, calculating a control amount of engine output of said engine by which said engine is controlled to change engine output so as to bring said actual amount of slippage of said driving wheels to said target amount of slippage, counting a time of a continuous low slippage state where a difference in average wheel speed between said driving wheels and said driven wheels is less than a predetermined speed, correcting said control amount of engine output so as to increase said output of said engine with an increase in said time of said continuous low slippage state, and restraining said correction of said control amount of engine output when said control amount of engine output during said counting of said time increases so that said continuous low slippage state ends.

2. A traction control system as defined in claim 1, wherein said traction control means calculates an arithmetic mean of left and right driving wheels as said average wheel speed.

3. A traction control system as defined in claim 1, and further comprising friction coefficient sensor means for detecting a road friction coefficient of a road on which said automotive vehicle is traveling, wherein said traction control means calculates said target amount of slippage based on said wheel speeds of said driven wheels and said road friction coefficient.

4. A traction control system as defined in claim 3, wherein said traction control means performs fuel-cut in predetermined fuel-cut patterns according to said control amount of engine output so as thereby to control engine output.

5. A traction control system as defined in claim 4, wherein said traction control means performs said correction of said control amount of engine output with a delay of a predetermined time.

6. A traction control system as defined in claim 4, wherein said traction control means commences said counting of said continuing time with a delay of a predetermined time.

7. A traction control system as defined in claim 4, wherein said time of continuous low slippage state is compared with each of a plurality of predetermined threshold times which are increased in a stepwise during said counting of said time increases so that said continuous low slippage state ends.

8. A traction control system as defined in claim 7, wherein said traction control system performs said correction of said control amount of engine output by adding to each said threshold time a predetermined time.

9. A traction control system as defined in claim 8, wherein said traction control system decreasingly changes said predetermined time with an increase in engine speed.

10. A traction control method of controlling output of an engine of an automotive vehicle so as to bring slippage of driving wheels close to target slippage, said traction control method comprising:

detecting a wheel speed of each of driving and driven wheels of the automotive vehicle;

calculating a target amount of slippage based on said wheel speeds of said driven wheels;

calculating an actual amount of slippage of said driving wheels based on said wheel speeds of said driving and driven wheels;

calculating a control amount of engine output of said engine by which said engine is controlled to change engine output so as to bring said actual amount of slippage of said driving wheels to said target amount of slippage;

counting a continuing time which is defined as a continuation period of a low slippage state where a difference in average wheel speed between said driving wheels and said driven wheels is less than a predetermined speed;

correcting said control amount of engine output so as to increase said engine output of said engine with an increase in said continuing time; and restraining said correction of said control amount of engine output when said control amount of engine output is controlled to increase during said counting of said continuing time.

11. A traction control method as defined in claim 10, and further comprising the step of detecting a road friction coefficient of a road on which said automotive vehicle is traveling, wherein said target amount of slippage is calculated based on said wheel speeds of said driven wheels and said road friction coefficient.

12. A traction control method as defined in claim 11, wherein said correction of said control amount of engine output is performed with a delay of a predetermined time.

13. A traction control method as defined in claim 11, wherein said counting of said continuing time is commenced with a delay of a predetermined time.

14. A traction control method as defined in claim 11, wherein said time of said continuous low slippage state is compared with each of a plurality of predetermined threshold times which are increased in a stepwise manner during said correction of said control amount of engine output.

15. A traction control method as defined in claim 14, wherein said correction of said control amount of engine output is performed by adding to each said threshold time a predetermined time.

16. A traction control method as defined in claim 15, wherein said predetermined time is decreasingly changed with an increase in engine speed.

* * * * *